INVENTORS
JAMES W. FODREA
WILLIAM H. BOMAN
TRYGVE VIGMOSTAD
BY
ATTORNEY

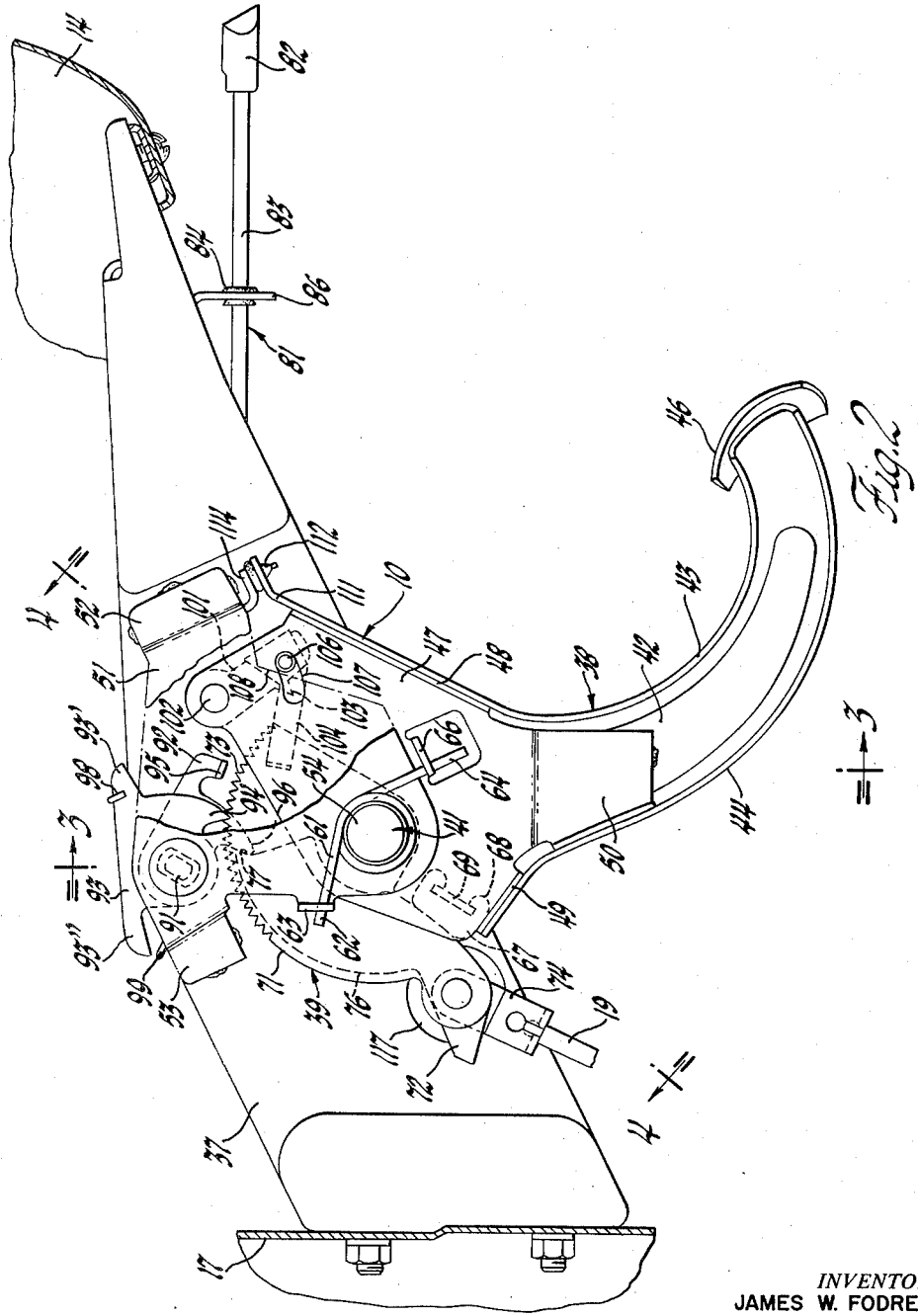

Feb. 15, 1966   J. W. FODREA ETAL   3,234,812
BRAKE LEVER
Filed Jan. 27, 1960   3 Sheets-Sheet 3
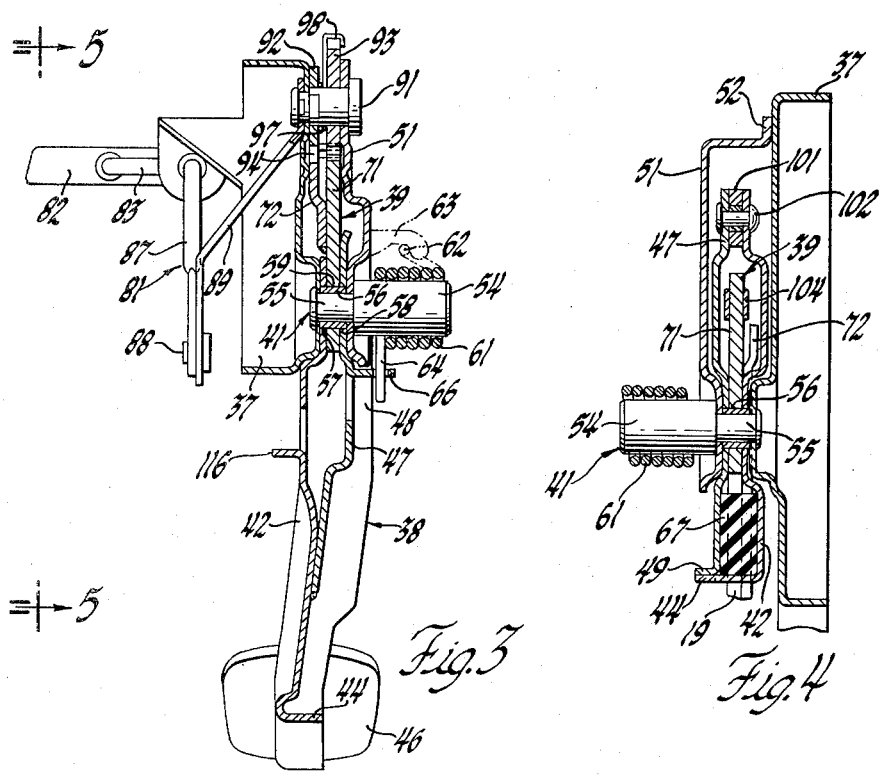
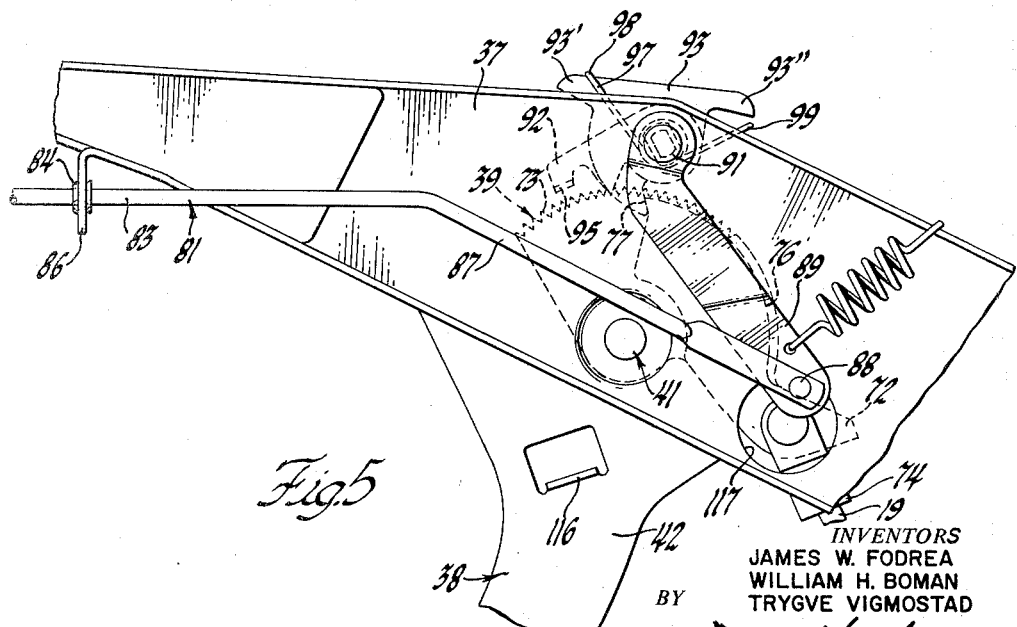
INVENTORS
JAMES W. FODREA
WILLIAM H. BOMAN
TRYGVE VIGMOSTAD
BY
*A. M. Heiter*
ATTORNEY 3,234,812
BRAKE LEVER
James W. Fodrea, Rochester, William H. Boman, Birmingham, and Trygve Vigmostad, Mount Clemens, Mich.; said Fodrea and said Boman assignors to General Motors Corporation, Detroit, Mich., a corporation of Delaware
Filed Jan. 27, 1960, Ser. No. 5,010
6 Claims. (Cl. 74—534)

This invention relates to brake levers particularly of the emergency brake type having a ratchet mechanism to hold the brake in the apply position and a release linkage.

The invention is particularly adapted for use on emergency brake levers which are manually applied and have a ratchet mechanism to hold the brake in the applied position and a release linkage to release the ratchet mechanism in order to release the brake. In a brake lever of this type it is desirable to provide a signal indicating that the brake is applied so that the driver will not drive a vehicle with the emergency brake applied and burn the brake lining. Though various signal arrangements employing electric lights and audible signals have been employed these involve substantial added expense. In accordance with this invention the conventional ratchet release handle can be employed to provide a visual signal indicating that the brake is applied. This is done by connecting the brake lever through an actuating linkage to the brake release linkage to move the brake release linkage and release handle to a different position when the brake is applied to visually indicate to the operator of the vehicle that the brakes are applied.

The object of the invention is to provide in a brake lever having a ratchet mechanism holding the brake in the applied position and a release linkage to release the ratchet mechanism, a device to move the release linkage from one position when the brakes are disengaged to a second position when the brakes are engaged to indicate to the vehicle operator the fact that the brakes are engaged.

Another object of the invention is to provide in a brake linkage a novel cable and lever arrangement connected in the brake lever to the wheel brake.

These and other objects of the invention will be more apparent from the following description and drawing of the preferred embodiment of the invention.

FIG. 2 is a view of the brake lever with parts broken away and in section.

FIG. 3 is a sectional view of FIG. 2 on the line 3—3.

FIG. 4 is a sectional view of FIG. 2 on the line 4—4.

FIG. 5 is a partial sectional view of FIG. 3 on the line 5—5.

Figure 1:
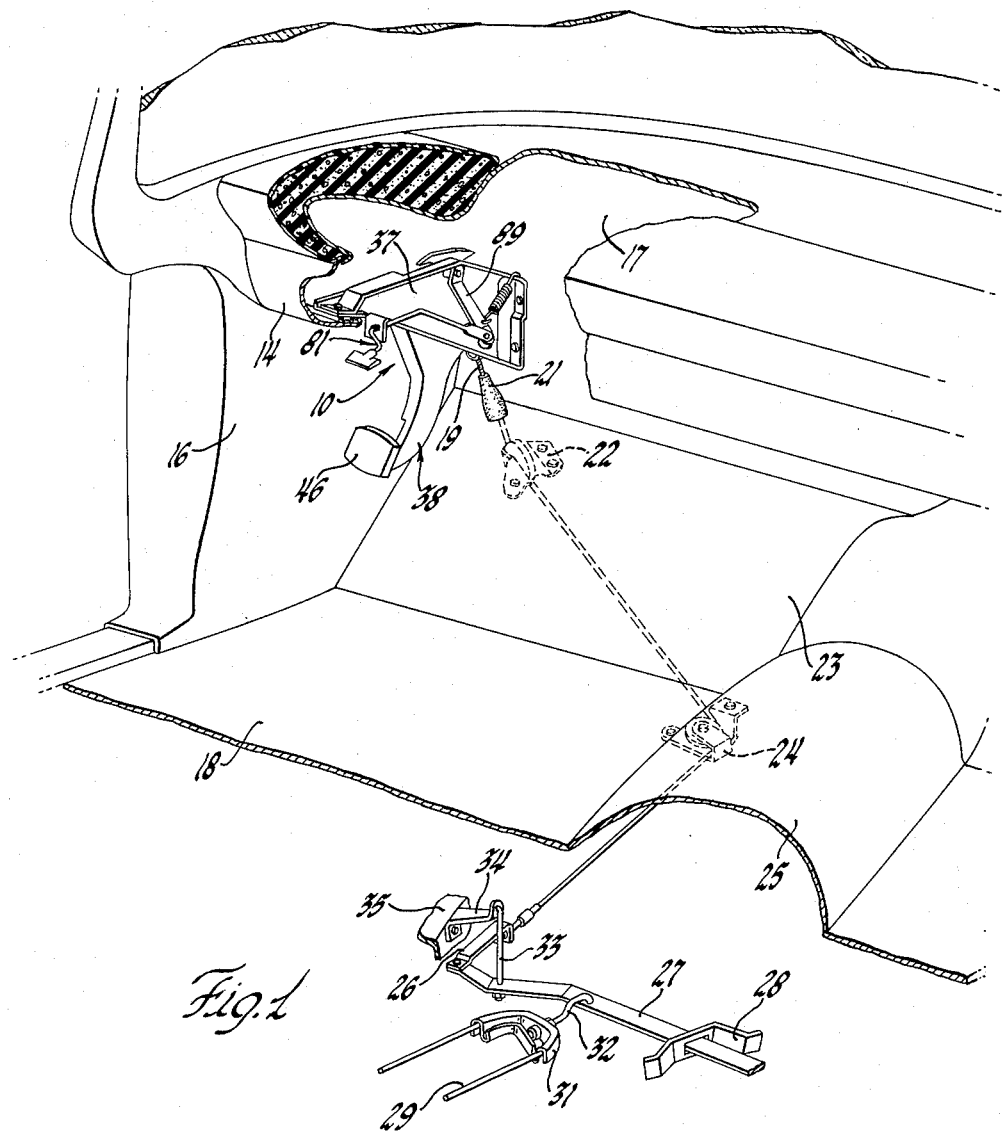
FIG. 1 shows the brake lever and linkage installation in a vehicle with parts broken away and in section to show the details.

The brake lever 10 and the cable and lever or the operating linkage connecting the brake lever to the vehicle wheels is shown in FIG. 1 mounted in a conventional automotive vehicle. The dash panel 14 is mounted between side walls 16. The fire wall 17 is located between the passenger compartment and the engine compartment of the vehicle. The passenger compartment has a floor 18. The brake lever 10 is mounted between the dash panel 14 and fire wall 17 and actuates a brake cable 19 which passes through a rubber bushing 21 fixed to the sloping portion 23 of floor 18. The cable 19 after passing through the floor fits in the sheave of pulley 22 attached to the underside of the floor portion 23. The cable continues rearwardly and toward the center of the vehicle, parallel to the sloping floor portion 23, and passes over the pulley 24 and then rearwardly in the tunnel 25 of the floor 18. The cable 19 is connected by a link 26 which is pivotally connected to the equalizing lever 27. The lever 27 is pivotally mounted in a suitable aperture in the bracket 28 secured to the vehicle frame. The cable 29 connected at each end to the vehicle brakes (not shown) passes through a curved channel member 31 having a suitable stiffening flange. The channel is connected by hook 32 to the lever 27. The lever 27 is supported at the end adjacent link 26 by a swinging rod 33 suitably secured to the link 27 and pivotally connected and supported on a bracket 34 secured to the vehicle frame 35.

The brake lever 10 as illustrated in detail in FIG. 2 is mounted on a support bracket 37 suitably secured at its forward end to the fire wall 17 and the rear end to the dash panel 14. The brake lever asssembly 38 and the sector lever assembly 39 are independently pivotally mounted on a pivot pin 41 fixed to the support bracket 37.

The brake lever assembly consists of a main lever 42 made of a formed channel shaped part having flanges 43 and 44. A pedal 46 is secured to the flange at the end of the channel. Flanges 48 and 49 of reinforcement plate 47 mate with a portion of the flanges 43 and 44 of the main lever 42 and are welded together to provide the unitary lever assembly 38. The plate 47 has an offset portion 50 welded to the main lever 42.

A support plate 51 having offset portions 52 and 53 secured to the support bracket 37 provides an additional bracket portion spaced from the bracket 37 to provide a two point support for the brake lever pivot pin 41. The pivot pin 41 has an enlarged portion 54 providing a shoulder which engages the plate 51 and a narrower pin portion 55 which extends through apertures in the plate 51 and the support bracket 37 and is secured to the bracket by riveting the end of the pin portion. A bearing sleeve 56 surrounds the pin portion 55 to locate the plate 51 and support bracket 37 in spaced relation and provide a bearing surface for the brake lever assembly 38 and the sector assembly 39. The main lever 42 has an aperture 57 and the reinforcing plate 47 has an aperture 58 fitting the sleeve 56 to rotatably support the brake lever 38. Sector lever assembly 39 has an aperture 59 to rotatably support the sector assembly on the sleeve 56 on pin 41. The brake lever 38 is resiliently biased to the off or disengaged position by coil spring 61 positioned on the large portion 54 of pin 41 having one end 62 engaging a stop tab 63 bent outwardly from the plate 51 to prevent movement of spring end 62 in a clockwise direction (FIG. 2) and a spring end 64 engaging a stop tab 66 formed by slitting the reinforcing plate 47 and bending up the tab to prevent counterclockwise movement and spring end 64.

Brake lever 38 acts during the initial braking stroke through the resilient abutment 67 to move the sector lever assembly 39 counterclockwise (FIG. 2) to apply the brakes through cable 19. The abutment 67, formed of rubber-like material, is located between reinforcing plate 47 and main lever 42 and has hook portions 68 to lock the bumper on a strut 69 which fits in apertures in the reinforcing plate 47 and the main lever 42. The strut is secured in place by riveting the ends.

The sector lever assembly 39 consists of a sector lever member 71 and a cam member 72 secured by welding to the side face of the sector member. The sector member has a series of ratchet teeth 72 formed in a circular arc about the pin 41 on which the sector 39 pivots. The cable 19 is connected by a clevis 74 riveted to the sector lever member 71. The cam member 72 has a circular portion 76 formed about the center of pin 41 and an end portion 77 cooperating with the release linkage as described below to provide the visual brake apply signal.

The brake release linkage 81 has an operating handle 82 secured to the release rod 83. The rod 83 is supported for reciprocating movement by a rubber grommet 84 supported on a tab portion 86 of the bracket 37. The rod 83 (FIG. 5) has a downwardly bent portion 87 pivotally connected by a pin 88 to the lower end of a lever 89. The other end of the lever is fixed outside of bracket 37 to a pin 91 rotatably mounted in apertures in the support plate 51 and the support 37. A cam member 92 is also fixed to the pin 91 between bracket 37 and portion 51 and in alignment with the cam 72. A ratchet pawl 93 is rotatably mounted on the pin 91 in alignment with sector lever 71 and has a tooth 94 cooperating with the serrations 73 providing a detent mechanism. The cam member 92 has a projecting portion 96 engaging the cam surfaces 76 and 77. The coil spring 97 wrapped around the pin 91 has one end 98 engaging the pawl 93 and another end 99 engaging the support 37 to urge the pawl to rotate in a clockwise direction (FIG. 5) to engage the ratchet teeth. The tongue 93" engages the transverse portion of offset 53 to limit releasing rotation of pawl 93.

A secondary driving pawl is pivotally mounted on a pin 102 secured in suitable apertures in the main brake lever member 42 and the reinforcing plate 47. The pawl 101 is located between the member 42 and plate 47 and in alignment with the sector lever 71 so that the tooth 103 on pawl 101 may engage the teeth or serrations 73 of sector lever member 71. A pawl actuator consisting of a U-shaped spring member 104 is positioned over the swinging end of pawl 101 with the base of the U in contact with the top edge of the pawl opposite the tooth 103 and secured in position by a pin 106 closely fitting apertures in the spring and press-fitted in the pawl to secure the spring on the pawl. Pin 106 extends beyond the spring and into an elongated arcuate slot 107 in the plate 47 to limit the pivotal movement of the pawl 101. The legs of the U-shaped spring member 104 resiliently engage the side surfaces of the ratchet sector lever member 71 sufficiently to transmit a force between the ratchet member and the pawl to actuate the pawl in accordance with sector movement.

Counterclockwise (FIG. 2) or release movement of the brake lever 38 is limited by a stop abutment formed by an extension 111 of the flange 43 of lever 42, which has a resilient member 112 attached. In the fully released position shown in FIG. 2 stop 111–112 engages an abutment portion 114 on the bracket 37. Movement of the brake lever 38 in the apply direction or counterclockwise direction as viewed in FIG. 5 is limited by a tongue 116 bent outwardly from the brake lever 38 which engages the support bracket 37 to limit movement in the brake apply direction. The abutment 117 located around the clevis pin on the sector lever member 71 limits brake apply movement of the sector member when it engages an offset portion 53 of plate 51.

The brake is illustrated in FIG. 2 in a fully released position. During the first operator stroke when the operator pushes the pedal 46 clockwise and rotates the lever 38 about the pin 41, the abutment 67 engages the sector lever assembly 39 and rotates it with the brake lever and the sector lever member 71 transmits the operating force to move the brake cable 19 in the brake apply direction. The initial movement of the brake sector lever assembly 38 causes actuation of the linkage mechanism to move the brake release lever linkage 81 to provide a signal to the operator that the brakes are applied. The initial brake lever movement moves the sector lever assembly 39. The cam member 72 on this assembly acts through the cam portion 77 on the portion 96 of the rotatable cam 92 to rotate the cam 92. Since the cam 92 is fixed to pin 91 which is fixed to lever 89 rotation of cam 92 will rotate the lever 89 and move the rod 83. The handle 82 is moved outwardly or further into the operator's compartment to provide a visual signal indicating to the operator that the vehicle's emergency brakes are applied. During this initial brake apply stroke the tooth 94 of ratchet pawl 93 rides over the ratchet teeth 73 on the sector lever member 71. When the apply pressure is removed from the brake lever 37 the rachet pawl 93 will hold the sector lever member 71 and thus the brake cable 19 in the furthermost position reached and the spring 61 will operate to return the brake lever 38 to the fully released position in which stop 112 engages abutment 114. During this first apply stroke the sector lever assembly 39 will have been rotated so that the teeth 73 of sector lever member 71 are beneath the tooth 103 of the secondary or driving pawl 101. Also during this first apply movement of the sector lever member 71 and lever 38 move together so the U-shaped spring member 104 will not move the pawl 101. During the return movement of the lever 38 in a counterclockwise direction (FIG. 2) relative to sector assembly 39, the U-shaped spring member 104 due to the drag between it and the sector assembly 39 will rotate the pawl 101 counterclockwise to the position shown (FIG. 2) where it will be out of contact with the teeth 73 to prevent a clicking noise. Then on a second or subsequent brake apply stroke clockwise movement (FIG. 2) of the brake lever 38 will initially, during a brief relative movement of the brake lever 38 and sector lever member 71 by the drag of U-shaped spring 104, rotate pawl 101 clockwise so that the tooth 103 of pawl 101 engages the teeth 73 of the sector lever member 71 and transmit force through the pawl 101, tooth 103 and ratchet teeth 73 to the sector lever member 71 and assembly 39 to further apply the brake. Pawl 93 will at all times hold the sector assembly 39 in the furthermost applied position. During this operation the tab 95, although raised upwardly toward pawl 93, will not interfere with the ratchet operation of the pawl 93.

When it is desired to release the brakes the handle 82 being in the outer position signalling the fact that the brakes are applied is merely moved outwardly an additional short distance to further rotate the cam member 92 which was in an intermediate position with the cam portion 96 riding on the surface 76 counterclockwise so that the tab 95 engages a tab 93' on the pawl 93 to lift the pawl and move the tooth 94 out of engagement with the ratchet teeth 73 to permit complete release of the sector assembly 39 and the brakes. During release the secondary pawl 101 is released, since spring 61 holds lever 38 in the release position and pin 106 engages the edge 108 of the support plate 51 positively holding cam 101 in the released position shown in FIG. 2.

The above described embodiment of the invention may be modified within the scope of the appended claims.

I claim:

1. In a linkage assembly, in combination, a support, a lever movably mounted on said support for movement from a released position to an applied position, operating means connected to said lever to move said lever, connector means on said lever providing a connection to apply a mechanism during movement of the lever from said released position to said applied position, detent means including a portion operatively connected to said lever and a portion operatively connected to said support for releasably connecting said lever to said support and operable in engaged position to hold said lever in said applied position and in disengaged position to permit free movement of said lever on said support, release means connected to said detent means and mounted on said support for movement independent of said movement of said lever and operative on said movement of said release means from a first position to a second position to disengage said detent means, and actuator means connected between said lever and said release means for moving said release means to a visible apply signalling position on movement of said lever from the released position to any partially applied position and for holding said release means in said signal position when said brake lever is in any applied position and permitting manual movement of said release means to said second position.

2. A brake assembly, in combination, a support, a brake lever movably mounted on said support for movement from a released position through a series of partially applied positions to a fully applied position, operating means connected to said lever to move said lever, connector means on said brake lever providing a connection to apply a brake during movement of the brake lever from said released position to said applied positions, detent means including a portion operatively connected to said lever and a portion operatively connected to said support for releasably connecting said brake lever to said support and operable in engaged position to hold said brake lever in a partial or fully applied position and in disengaged position to permit free movement of said brake lever on said support, release means connected to said detent means and mounted on said support for movement from a normal position to a signal position and for movement from said signal position to a release position of said movement of said brake lever and operative on said movement of said release means from said signal position to said release position to disengage said detent means, and actuator means connected between said brake lever and said release means for moving said release means from said normal position to said signal position on movement of said brake lever from the released position to any partially or fully applied position and for holding said release means in said signal position when said brake lever is in any applied position and for permitting manual movement of said release means to said release position.

3. A brake assembly, in combination, a support, a brake lever movably mounted on said support for movement from a released position to an applied position having a depending foot pedal portion movable in one direction from said released position to said applied position, operating means connected to said lever to move said lever, connector means on said brake lever providing a connection to apply a brake during movement of the brake lever from said released position to said applied position, detent means including a portion operatively connected to said lever and a portion operatively connected to said support for releasably connecting said brake lever to said support and operable in engaged position to hold said brake lever in said applied position and operative in disengaged position to permit free movement of said brake lever on said support, release means connected to said detent means and independently mounted on said support for movement in another direction from a normal position to a visible signal position and movable independent of said movement of said brake lever to a release position and operative on said movement of said release means from said normal position or said signal position to said release position to disengage said detent means, and actuating means connected between said brake lever and said release means for moving said release means from said normal position to said signal position on movement of said brake lever from the released position to any partially applied position and for holding said release means in said signal position at all times when said brake lever is in any brake applied position and for permitting manual movement of said release means to said release position.

4. A brake assembly, in combination, a support, a brake lever movably mounted on said support for movement from a released position to an applied position having a manually operated portion moving in one direction on movement of said brake lever from said released position to said applied position, operating means connected to said lever to move said lever, connector means on said brake lever providing a connection to apply a brake during movement of the brake lever from said released position to said applied position, detent means including a portion operatively connected to said lever and a portion operatively connected to said support for releasably connecting said brake lever to said support and operable in engaged position to hold said brake lever in said applied position and in disengaged position to permit free movement of said brake lever on said support, release means connected to said detent means and mounted on said support for movement and having a manual control handle movable in another direction from a normal position to a visible signal position and further movable to a release position and inoperative on movement from said normal position to said signal position to disengage said detent means and operative on said movement from said signal position to said release position to disengage said detent means, and linkage means connected between said brake lever and said release means operative in response to movement of said brake lever from said released position to an applied position to move said release means from said normal position to said signal position and for holding said release means in said signal position when said brake lever is in any applied position and for permitting manual movement of said release means to said release position.

5. A brake assembly, in combination, a support, a brake lever pivotally mounted on said support for movement from a released position to a plurality of partially applied positions having a manually operated portion moving in one direction on movement of said brake lever from said released position to said applied position, operating means connected to said lever to move said lever, connector means on said brake lever providing a connection to apply a brake during movement of the brake lever from said released position to an applied position, detent means including a portion operatively connected to said lever and a portion operatively connected to said support for releasably connecting said brake lever to said support and operable in engaged position to hold said brake lever in any applied position and in disengaged position to permit free movement of said brake lever on said support, release means connected to said detent means and mounted on said support for movement and having a manual control handle movable in a substantially opposite direction to said one direction from a normal position a visible significant distance to a signal position and further movable to a release position and inoperative on movement from said normal position to said signal position to disengage said detent means and operative on said movement of said release means from said signal position to said release position to disengage said detent means, and linkage means connected between said brake lever and said release means operative in response to movement of said brake lever from said disengaged position to any applied position for moving said release means from said normal position to said signal position and for holding said release means in said signal position when said brake lever is in any applied position.

6. A brake assembly, in combination, a support, a brake lever pivotally mounted on said support for movement from a released position to an applied position having a manually operated portion moving in one direction on movement of said brake lever from said released position to said applied position, operating means connected to said lever to move said lever, connector means on said brake lever providing a connection to apply a brake during movement of the brake lever from said released position to said applied position, detent means including a portion operatively connected to said lever and a portion operatively connected to said support for releasably connecting said brake lever to said support and operable in engaged position to hold said brake lever in said applied position and in disengaged position to permit free movement of said brake lever on said support, release means connected to said detent means and mounted on said support for movement and having a manual control handle reciprocally movable in a direction opposite to said one direction from a normal position a significant visible distance to a signal position and further manually movable to a release position and inoperative on movement from said normal position to said signal position to disengage said detent means and operative on manual movement of said release means from said signal position to said release position to disengage said detent means, and linkage means connected between said brake lever and said release means operative in response to movement of said brake lever from said disengaged position to any partially engaged position for moving said release means from said normal position to said signal position and for holding said release means in said signal position.

References Cited by the Examiner

UNITED STATES PATENTS

| | | | |
|---|---|---|---|
| 2,308,898 | 1/1943 | Skareen | 74—539 |
| 2,467,557 | 4/1949 | Jandus | 74—539 |
| 2,507,997 | 5/1950 | Roedding et al. | 74—522 X |
| 2,905,024 | 9/1959 | McCarthy et al. | 74—539 |
| 2,908,185 | 10/1959 | Koskela | 74—539 X |
| 2,923,169 | 2/1960 | Hinsey | 74—539 X |
| 2,940,334 | 6/1960 | Koskela | 74—539 |
| 2,986,046 | 5/1961 | Vigmostad | 74—540 |
| 3,002,394 | 10/1961 | Spisz | 74—542 X |

BROUGHTON G. DURHAM, *Primary Examiner.*

SAMUEL SPINTMAN, *Examiner.*